United States Patent

[11] 3,580,364

| [72] | Inventor | Cornelis M. Verhagen<br>Heemstede, Netherlands (c/o Datawell N.V.,<br>Zomerluststr. 4, Haarlem) |
|---|---|---|
| [21] | Appl. No. | 796,830 |
| [22] | Filed | Feb. 5, 1969 |
| [45] | Patented | May 25, 1971 |
| [32] | Priority | Feb. 14, 1968, Nov. 29, 1968 |
| [33] | | Netherlands |
| [31] | | 6802128 and 6817189 |

[54] STABILIZATION PENDULUM SYSTEM
17 Claims, 8 Drawing Figs.

[52] U.S. Cl. ..................................................... 188/87, 188/1
[51] Int. Cl. .................................................... F16d 57/00
[50] Field of Search ........................................ 188/1 (B), 103, 87; 312/351; 73/430

[56] References Cited
UNITED STATES PATENTS

| 3,294,467 | 12/1966 | Rademakers | 188/87 |
| 3,310,138 | 3/1967 | Reed | 188/87 |

*Primary Examiner*—Duane A. Reger
*Attorney*—Brumbaugh, Graves, Donohue & Raymond

ABSTRACT: Stabilization pendulum system comprising a vessel filled with a liquid, an object immersed in the liquid, the weight of the object differing very little from the weight of the displaced liquid, and the object containing electrical measuring equipment, the system also including a suspension means attached to the vessel. The suspension means includes a suspension thread one point along the length of which is fixed, the object attaching to and suspending from the thread. The thread includes a free suspending portion between a point of the vessel and a point of the object, and further includes one or more electrical connectors integral therewith which serve as electrical connections for the measuring equipment. The suspension means also includes a guiding body, the portion of which is nearest the object defines a guiding surface that includes a bore extending into the guiding body, the free suspending portion of the thread running through the bore whose diameter gradually increases in a direction toward the object. The thread also extends beyond the point of the vessel in a direction away from the object.

PATENTED MAY 25 1971

INVENTOR
CORNELIS MARINUS VERHAGEN

Brumbaugh, Graves, Donohue & Raymond
ATTORNEYS

PATENTED MAY25 1971 3,580,364

INVENTOR
CORNELIS MARINUS VERHAGEN

ATTORNEYS

STABILIZATION PENDULUM SYSTEM

The invention relates to a gravitation pendulum system for stabilization purposes, provided with a vessel filled with a liquid, in which a suspension thread, supporting an object containing electrical measuring equipment, has a free suspending portion between a point of the vessel and the object, the weight of the object differing very little from the weight of the liquid displaced by the object.

A pendulum system of this type has very low natural oscillating frequencies, because the return forces, in case of deviations from the equilibrium position, are small as compared with the mass or the moment of inertia with respect to the object. This does not apply when other return forces, such as forces generated by gyroscopes, occur. In view of this the invention only relates to pendulum systems, in which gravity supplies the return force, and not to systems in which gyroscopes are used.

A pendulum system of the above indicated type is described in U. S. Pat. No. 3,294,467, which has been assigned to the same party as has this application.

A difficulty with the known system is, that the measuring equipment has to be provided with electrical connections. Also in the case that these electrical connections consist of very thin threads formed in a number of windings, e.g. in the form of a spiral or helical line, these threads contribute to the rigidity of the suspension, to such a degree that the stabilization is unfavorably affected. Besides this the conductors can have the tendency to buckle or can become entangled into each other. With this it was important that the electrical conductors were attached to the object at a given distance from its suspension point, by which they were in a condition to exert a moment upon the object, which could not be neglected.

The rigidity of the electrical conductors will play a greater part if the rigidity of the suspension thread has a very small cross-sectional area, which is possible when the weight of the object differs very little from the weight of the liquid displaced by the object. In that case an extremely thin suspension thread will suffice, because of which the electrical conductors also should have to be extremely thin, by which the danger of buckling is considerably increased again.

The invention provides a solution with which buckling and entangling of the electrical conductors is completely prevented.

According to the invention there is provided a suspension thread containing one or more electrical conductors, which can serve as connections for the measuring equipment.

Electrical conductors, however, especially when they are made of metal, present the characteristic of fatigue and failure when they are repeatedly deformed beyond a certain limit.

In view of this and according to a further embodiment, the invention provides that the free suspending portion of the thread, near said point, is surrounded by a guiding body, provided with a bore, the diameter of which is gradually increasing into the direction of the object.

By this the bending radius of the thread is restricted and can be limited to a certain value.

A favorable embodiment consists in that the bore of the guiding surface is shaped as a surface of revolution, formed by an arc of a circle, which is tangent or nearly tangent to the outer surface of the thread. This shape of the guiding surface ensures that the thread has the same curvature over its entire curved length adjacent said point.

Preferably the radius of curvature of this curve is at least 100 times the radius of the thread. By this it is obtained that the deformation of the thread for most metals is amply below the limit of elasticity and no fatigue will occur.

Another type of mechanical force on the thread is a torsional strain. This can lead to failure, too.

According to a further elaboration of the invention the thread portion subject to torsional strain may be made substantially longer in that the thread is extended beyond the said point in the direction away from the object. Preferably the thread extends as far as the surface of the vessel. When the vessel is spheroidal, as is preferred for obtaining a minimum oscillatory deviation of the object, said point is preferably positioned near the center of the sphere. When in that case the free suspending part of the thread has a length of about one-third up to 1/10 of the radius of the sphere, the length of that part of the thread which can be torsional loaded, can be increased of from 4 up to 11.

To protect the thread from rupture when being overloaded during a short time, e.g. when the object should come into contact with a part of the vessel, according to a further elaboration of the invention, it is provided that the thread at least at one end is connected with an elastic membrane.

The invention can be employed when only one conductor is used, as well as when more such conductors are used. Besides this it has proved to be important, that, when using a number of conductors, these are insulated from each other in a very high measure, or that at least one of them is insulated from the other threads in a very high measure, in which case this one thread can be used for transferring the measuring dates and the other threads for feeding the measuring equipment.

According to a further elaboration of the invention it is provided, that the thread consists of more than one subthread, each of them containing one or more metallic conductors, and that the subthreads at least at some places are lying beside each other, the planes in which they are lying beside each other at these places being turned over at least 90° over the length of the thread.

Because of this the bending stiffness of the thread in any direction has a minimum at least at one place, as at this place the threads are lying beside each other, such that in the direction perpendicular to the plane the bending stiffness has a minimum.

As the threads have to be mutually electrically insulated, it is necessary to use a covering material that has a high degree of insensitiveness to fatigue. A further difficulty is that the object sometimes can perform a considerable rotational movement in view of the suspension point, with which the rotational movement of the thread in said suspension point causes friction, which in the long run can cause considerable abrasion, e.g. when the system is used for measurement of waves or other water movements and is mounted in a buoy.

It has appeared that rubber is a very suitable material to eliminate these difficulties. In addition to its insulating properties it has the property that it can resist large deformations. In case of friction with a fixed part, initially the deformations of the rubber absorb the relative displacement of the thread in view of the fixed part, up to a limit value is reached with which a displacement of the rubber surface with respect to the fixed part has to occur. Because of the energy, which has been accumulated in the rubber and which comes free, the rubber has the tendency to jump away somewhat from the surface with which it is in contact, by which the friction abrasion remains extremely low. In case of measuring systems which have to work for a long time without maintenance, it has appeared that the rubber protection of the threads contributes surprisingly much to their duration.

It is obvious that, with this embodiment of the invention, the subthreads never can be straight threads. Preferably they are twisted in their longitudinal direction, by which is meant that in their longitudinal direction they are generally helical in shape with a relatively small transverse diameter.

When the threads now are fixed to each other at some points and at these connection points are situated beside each other in such a way that the plane in which they are lying in a connection point is turned in view of the corresponding plane in the connection point which is situated higher or lower, the characteristic that the threads are lying beside each other in different planes and are having a minimum bending stiffness in different directions, is obtained easily. A further advantage of the embodiment described above is, that in the region between the connection point the subthreads may be spaced considerably apart, by which capacitive and galvanic couplings are kept very small. The connection of the threads shows to be easy to realize in case of a rubber covering, e.g. by means of local softening or by using a suitable adhesive.

In those cases with which the measuring dates have to be conveyed through one conductor, it has appeared that when applying the invention good results are obtained when at least one of the subthreads contains only one conductor.

The invention will be further explained with reference to the accompanying drawings, in which:

FIG. 1 schematically shows a device according to the invention;

Figure 1:
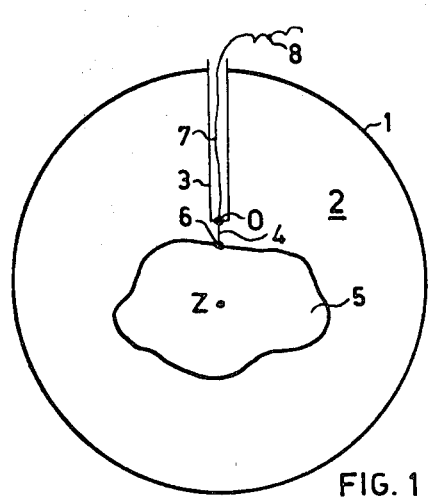

In FIG. 1 a spherical vessel is indicated by 1, which vessel is filled with a liquid 2. From the wall of the vessel a rod 3 is extending downwardly, the lower end of which is lying in the center 0 of the inner surface of the vessel 1. In 0 a thread 4 is fixed, which is extremely thin and to which a body 5 is suspended in its suspension point 6. The center of gravity of the body 5 is indicated with Z. According to the invention the thread 4 contains one or more electrical conductors. Although in special cases it is possible that the thread 4 consists of one electrical conductor only, generally speaking it will consist of more than one electrical conductor which are surrounded by an insulation having little rigidity.

The weight of the body 5 is about equal to that of the liquid 2 which is displaced by the body, such that the gravity exerts only a very small load on the thread 4. For obtaining a suspension of the object which is as quiet as possible, it is desired that the thread 4 is as thin as possible for carrying that weight of the body 5 when submerged in the liquid. The electrical thread 4 further is connected with an electrical conductor or a system of electrical conductors, which further run to one or more connection threads 8.

Figure 2:
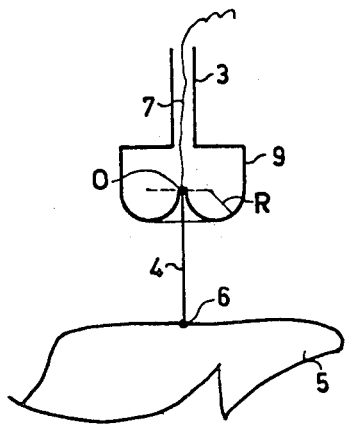
FIG. 2 shows a detail of FIG. 1 on an enlarged scale.

FIG. 2 shows a detail of FIG. 1 on an enlarged scale and of a somewhat altered embodiment. Generally speaking the same references are used as in FIG. 1. The difference with the embodiment of FIG. 1 is that the lower end of the rod 3 is provided with a body 9, the underside of which has the form of a bore. The radius R is at least 100 times the radius of the cross section of the thread 4. As the surface of revolution of the bore near the suspension point 0 is tangent or nearly so to the outer surface of the thread 4, it is obtained that the relative elongation by bending of the thread 4 is limited by the ratio of the radius of the thread 4 to the radius R. In this way it is possible to oppose fatigue of the thread up to a high degree so that use can be made of considerably thinner threads than might be possible without the body 9.

Such a suspension also could be used in point 6 of the object.

Figure 3:
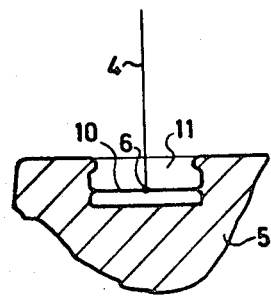
FIG. 3 shows a further detail.

As the thread 4 can be extremely thin, it is subjected to high stresses in case of shocks. For absorbing these an elastic link is applied in the form of a membrane 10, as is shown in FIG. 3. This membrane 10 is fitted into a cavity 11 of the body 5 and is somewhat elastic, such that shocks can be absorbed without the thread 4 being heavily loaded.

Figure 4:
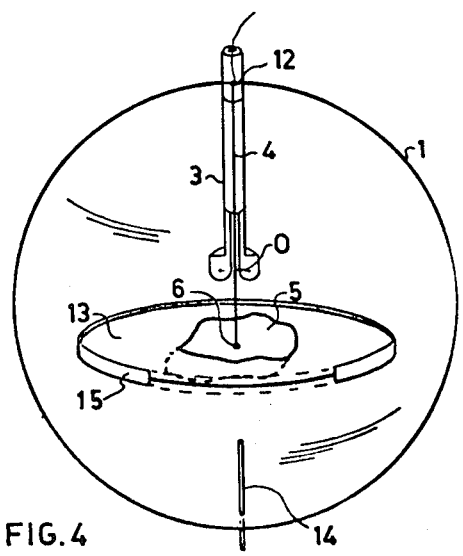
FIG. 4 shows another embodiment of the invention in the same way as FIG. 1.

FIG. 4 shows an embodiment of the invention, with which the thread 4 is elongated up to the wall of the vessel 1. By this a thread length from point 6 up to point 12 is available for absorbing torsion of the thread when the object 5 rotates relative to the vessel, e.g. when the vessel is rotated about a vertical axis. By this, fracture of the thread by torsional load is prevented to a high degree, at the same time the other characteristics of the pendulum system not being impaired.

Further, as shown in FIG. 4, the body 5 can be provided with an extension 13 in the form of a circular plate. This has the advantage, that an extensive coupling with the liquid is achieved, such that in case of tilting oscillations of the body 5 relative to its vertical axis, a relatively great mass of the liquid is moving along with the body 5 and contributes to the moment of inertia of the suspended body. By this the period of the tilting oscillations is increased.

An extension 13 in the form of a plate, however, in case of oscillations by which the body moves parallel to its own horizontal axis, only a small amount of liquid is taken along, such that the period of its oscillation by the liquid is increased only to a small extent and the amplitude will become only a little bit smaller. With many applications of the invention, which deal with the orientation stabilization of the object 5, this oscillation is of minor importance. A secondary effect, however, is that, when this oscillation occurs, the plate 13 has to move up and down somewhat, which movement is opposed by the liquid. By this the suspension thread 4 would periodically be supplementary loaded to a considerable degree.

In view of this the partially drawn cylindrical ring 15 is provided, which, in case of oscillations by the objects parallel to its horizontal axis, the period is considerably increased, because a very considerable mass of liquid is forced to move along with the object. This involves an amplitude reduction which also leads to a smaller supplementary load on the thread 4. A further advantage of the smaller amplitude of this oscillation is, that the extension 13 does not come near the wall of the vessel 1, where currents can appear, that are induced by movements of the inner surface of vessel 1, in case of relatively heavy movements of this vessel, by which the body could be forced out of its horizontal position, so that the stabilization should be impaired and fatigue of the thread 4 could occur.

It will be clear that the cylindrical ring 15 can be replaced or completed by any other element which is connected with the extension 13 of the body 5 ad which forms a coupling with the liquid with movements in horizontal directions.

As shown in FIG. 4 a detention pin 14 is provided, which serves for limiting the tilting movements of the body 5 together with the extension plate 13, with respect to the vessel 1.

Figure 5:
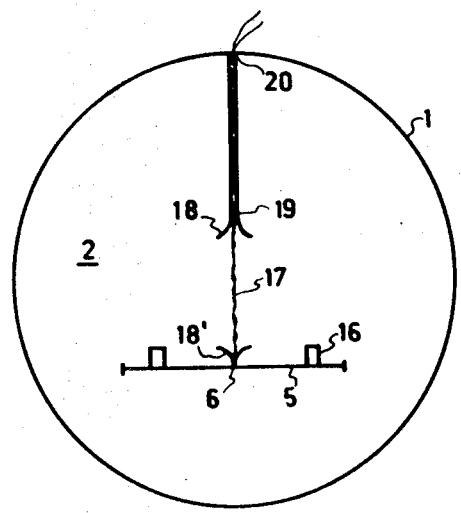
FIG. 5 shows an embodiment with subthreads.

FIG. 5 shows an embodiment of the invention, with which use is made of a thread 17, consisting of two subthreads. The thread 17 is free from the point 19 of a guiding body 18, the underside of which is provided with a flared bore, corresponding with that shown in FIG. 2, the thread being connected at 20 with the wall of the vessel 1. The object consists of a platform 5 with instruments 16, and is provided with a guiding body 18' at the connecting point 6 of the thread 17 with the platform 5, the bore of body 18' widening upwardly.

Figure 6:
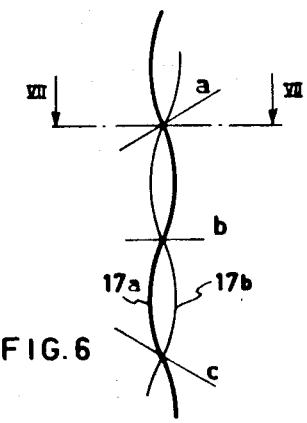
FIG. 6 shows a detail of FIG. 5 on an enlarged scale.

FIG. 6 shows a detail of the thread with which both of the subthreads 17a and 17b have a form which mainly is a helical line with a large pitch as compared with the distance from the imaginary centerline of the helical line, said distance between the sectional threads and this centerline, however, not being constant. As is known, a thread can easily be brought into such a form by twining it. In some points the threads are laid against each other and are connected with each other, with which care is taken of that the planes through the centerlines of the threads are rotated relatively to each other in successive connecting points of the subthreads.

Figure 7:
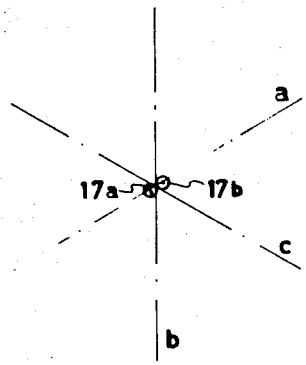
FIG. 7 shows a section over the line VII–VII in FIG. 6.

FIG. 7 shows, by means of the lines a, b and c, the position of the planes passing through the centerlines of the subthreads at the locations where they are connected with each other, which lines a, b and c are also indicated in FIG. 6. When applying the invention it is not absolutely necessary that the threads lie at a distance from each other between the points where their outer sides are contacting each other (corresponding with the points of the lines a, b and c in FIG. 6). It is also possible to lay them beside each other, such that a type of ribbon is formed, which is twisted. The embodiment according to FIGS. 6 and 7, however, has the advantage that the galvanic and capacitive couplings between the subthread 17a on the one side and the subthread 17b on the other side are extremely low.

The subthread 17a contains two electrical conductors and the subthread 17b contains only one conductor. Because the conductors only have a small diameter in comparison with the insulation (which is also still thin in its own), the outside diameters of both sectional threads 17a and 17b are about equal.

Figure 8:
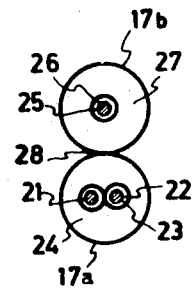
FIG. 8 shows a section of a detail of FIG. 7 on a still larger scale.

Finally, FIG. 8 shows, on an enlarged scale, a section through the thread according to the invention at a point in which the sectional threads are connected with each other. One sectional thread contains a pair of conductors 21 and 22, each being surrounded by an insulation 23, a rubber covering 24 being provided outside these insulations. The other sectional thread contains one conductor 25 with an insulation 26 and around it a rubber covering 27. The rubber coverings 24 and 27 are connected with each other at 28, e.g. by means of a suitable rubber adhesive or by melting them together. It has appeared that the rubber covering protects the thread against friction influences near the suspension points to a particular high degree, while it, due to the extremely low modulus of elasticity, contributes so little to the stiffness, that the bending stiffness coupling between the object 5 and the vessel 1 is not increased in a disturbing way.

I claim:

1. A stabilization pendulum system comprising: a vessel filled with liquid; an object immersed in the liquid, the weight of the object differing very little from the weight of the displaced liquid; the object containing electrical measuring equipment; the vessel including a suspension means which includes a suspension thread, one point along the length of which is fixed, the object attaching to and suspending from the thread; and the thread including a free suspending portion between a point of the vessel and a point of the object and further including one or more electrical conductors integral therewith which serve as electrical connections for the measuring equipment.

2. A stabilization pendulum system in accordance with claim 1 wherein the suspension means includes a guiding body, the portion of the guiding body nearest the object defining a guiding surface that includes a bore extending into the guiding body, the free suspending portion of the thread running through the bore, and the diameter of the bore gradually increasing in the direction toward the object.

3. A stabilization pendulum system in accordance with claim 2, wherein the bore is shaped as an arc-shaped surface of revolution, the portion of the bore at its smallest diameter being slightly larger than the diameter of the thread.

4. A stabilization pendulum system in accordance with claim 3, wherein the radius of the arc defining the bore is at least 100 times as large as the radius of the bore at its narrowest point.

5. A stabilization pendulum system in accordance with claim 1, wherein the thread extends beyond the point of the vessel in a direction away from the object.

6. A stabilization pendulum system in accordance with claim 5, wherein the thread extends to the surface of the vessel and is connected therewith.

7. A stabilization pendulum system in accordance with claim 1, wherein the object includes an elastic membrane, the thread attaching to the elastic membrane.

8. A stabilization pendulum system in accordance with claim 1, wherein the suspension means includes an elastic membrane, the thread attaching to the elastic membrane.

9. A stabilization pendulum system in accordance with claim 1, wherein the object includes a flat platelike extension member, and one or more flange elements extend outwardly from the extension member into the liquid, whereby a coupling is formed between the object and the liquid.

10. A stabilization pendulum system in accordance with claim 1, wherein the thread includes a plurality of subthreads, each subthread including one or more metallic conductors, the subthreads being positioned in adjacent relation at least at one point along their lengths, each subthread being rotated at least 90° over its entire length.

11. A stabilization pendulum system in accordance with claim 10, wherein each subthread includes an outside covering of rubber.

12. A stabilization pendulum system in accordance with claim 10, wherein the thread includes an outside covering of rubber.

13. A stabilization pendulum system in accordance with claim 10, wherein each subthread is twisted along its longitudinal axis and is attached to at least one other subthread at least at one point along its longitudinal axis.

14. A stabilization pendulum system in accordance with claim 13, wherein the longest distance between the subthreads along a line perpendicular to the collective longitudinal axis of the subthreads is substantially longer than the diameter of each of the subthreads.

15. A stabilization pendulum system in accordance with claim 10, wherein at least one of the subthreads contains only one conductor.

16. A stabilization pendulum system in accordance with claim 1, wherein the vessel includes a detention means projecting into the path of movement of the object, whereby tilting movements of the object will be limited with respect to the vessel.

17. A stabilization pendulum system in accordance with claim 1, wherein the vessel is spherical in shape, and one end of the free suspending portion of the thread is fixed at a point near the center of the vessel.

PO-1050
(5/69)

UNITED STATES PATENT OFFICE
CERTIFICATE OF CORRECTION

Patent No. 3,580,364            Dated May 25, 1971

Inventor(s) Cornelis M. Verhagen

It is certified that error appears in the above-identified patent and that said Letters Patent are hereby corrected as shown below:

Col. 2, lines 6 and 7, change "increased of from 4 up to 11" to -- increased with a factor of from 4 up to 11 --;

Col. 4, line 35, change "body 5 ad" to -- body 5 and --.

Signed and sealed this 21st day of March 1972.

(SEAL)
Attest:

EDWARD M. FLETCHER, JR.            ROBERT GOTTSCHALK
Attesting Officer                   Commissioner of Patents